United States Patent [19]
Lenart

[11] Patent Number: 6,012,481
[45] Date of Patent: Jan. 11, 2000

[54] CONSTANT-LEVEL FLUID SUPPLIER

[76] Inventor: John J. Lenart, 11205 Pavilion Club Ct., Reston, Va. 20194

[21] Appl. No.: 08/896,675

[22] Filed: Jul. 18, 1997

Related U.S. Application Data

[60] Provisional application No. 60/023,848, Aug. 13, 1996.

[51] Int. Cl.$^7$ .............................. F16K 31/22; F16K 31/24
[52] U.S. Cl. .................... 137/426; 137/142; 137/147; 137/151; 137/209; 137/391; 137/397; 137/398; 137/423; 137/433; 137/572; 141/95; 141/198; 222/67; 222/68; 222/204
[58] Field of Search ..................... 137/426, 209, 137/397, 398, 423, 409, 433, 142, 206, 147, 151, 571, 572, 557; 73/305; 222/64, 67, 68, 204; 141/47, 51, 95, 198

[56] References Cited

U.S. PATENT DOCUMENTS

| | | | |
|---|---|---|---|
| 1,290,358 | 1/1919 | Roberts | 137/151 |
| 1,536,054 | 5/1925 | Bartlett | 137/423 |
| 1,661,699 | 3/1928 | Magnin | 137/151 |
| 1,869,903 | 8/1932 | Lichtenberg | 137/142 |
| 2,739,939 | 3/1956 | Leslie | 137/428 |
| 2,809,752 | 10/1957 | Leslie | 137/428 |
| 2,818,877 | 1/1958 | Swanson | 137/428 |
| 2,835,270 | 5/1958 | York et al. | 137/428 |
| 3,739,405 | 6/1973 | Schmidt | 137/428 |
| 3,908,206 | 9/1975 | Grewing | 137/428 |
| 4,301,824 | 11/1981 | Payne | 137/423 |
| 4,373,220 | 2/1983 | Selsted | 137/428 |
| 4,686,718 | 8/1987 | Kinkhead et al. | 137/428 |
| 5,301,375 | 4/1994 | Osmond | 137/142 |
| 5,464,037 | 11/1995 | Younes | 137/426 |

OTHER PUBLICATIONS

Advertisement —Marlo Industries —Oct. 1996.

*Primary Examiner*—George L. Walton
*Attorney, Agent, or Firm*—Whitham, Curtis & Whitham

[57] ABSTRACT

A constant level of fluid (8 or 106) in vessel (1 or 104) is maintained using a reservoir (5 or 102) and a tank (4 or 101). Float valves (9 or 107) which raise and lower with the level of fluid in the reservoir are used to selectively close off fluid passages (13 or 109) from the tank into the reservoir. Until the desired level of fluid is reached in the reservoir, the reservoir continuously provides fluid to the vessel. Once fluid flow into the reservoir is stopped, flow from the reservoir into the vessel also stops. The vessel can be positioned adjacent to or remote from the reservoir.

14 Claims, 1 Drawing Sheet

CONSTANT-LEVEL FLUID SUPPLIER

CROSS-REFERENCE TO RELATED APPLICATIONS

This application is a continuation-in-part (CIP) application of the provisional patent application filed Aug. 13, 1996, having U.S. Ser. No. 60/023,848, and the complete contents of that application are herein incorporated by reference.

DESCRIPTION

BACKGROUND OF THE INVENTION

1. Field of the Invention

The present invention generally relates to maintaining a constant level of fluid in a container via a remote source of fluid.

2. Background Description

Many containers which need to maintain a level of fluid will run below that level if not checked by regular human measurement. This situation applies to many varied environments including Christmas tree stands, house plants, water containers for pets, liquid chemical distribution vats in industrial environments, liquid pharmaceutical distribution in clinics and hospitals, and in the distribution of fluids and feed to penned and field live-stock. It would be advantageous to provide a low cost apparatus which maintains desired fluid levels in these and other applications without requiring excessive human involvement.

SUMMARY OF THE INVENTION

It is an object of this invention to provide an apparatus which maintains fluid in a vessel at a constant level, continuously filling the vessel to the desired level as portions are withdrawn or otherwise removed, without the need for excessive human involvement.

It is another object of this invention to provide an apparatus which allows the level of fluid in an adjacent or remote vessel to be constantly maintained at a variety of different heights which are selected by the user.

According to the invention, a constant fluid supply apparatus includes a tank, a reservoir, and a vessel, all in fluid communication with one another, and a mechanism for maintaining the fluid in the vessel at a constant height. As fluid is withdrawn from the vessel, it is re-filled by the reservoir, and as fluid is withdrawn from the reservoir it is re-filled by the tank. The fluid volume in the vessel can be considerably smaller than that which is in the reservoir, thus, the fluid level in the vessel can be maintained for extended periods of time. The reservoir and vessel can be adjacent to one another or be separated by small or large distances depending upon the application. For remote applications, conduits such as pipes or tubing can be used to deliver fluid from the reservoir to the vessel. If desired, valves, clamps or other shut-off mechanisms can be used in conjunction with the conduit to selectively shut-off fluid flow from the reservoir to the vessel. In industrial applications the air pressure over the fluid in the reservoir may need to be closely controlled to be the same as over the vessel, and to achieve this relationship sensors and air pressure supplies can be connected to the reservoir.

Without external pressures applied to either the reservoir or vessel, the level of the fluid in the vessel is directly related to the level of fluid in the reservoir, and a single plane above the ground or base level of the vessel will pass through the prescribed fluid level in both the vessel and the reservoir. Thus, by regulating the level of fluid in the reservoir, the level of fluid in the vessel can be controlled. The fluid level in the reservoir is preferably controlled using float valves which selectively close off a passage in the tank which permits fluid flow from the tank to the reservoir, and by selecting the height of the tank above the plane which passes through the vessel and the reservoir. Once fluid is discharged from the tank to the point to a selected level in the reservoir, the float valve closes of the passage between the tank and the reservoir. Fluid from the reservoir discharges into the vessel through a second passage. Because the air pressure over the fluid in the reservoir is the same as that over the fluid in the vessel (e.g., usually ambient temperature and pressure), the vessel is only filled to the same level as the level of fluid in the reservoir.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
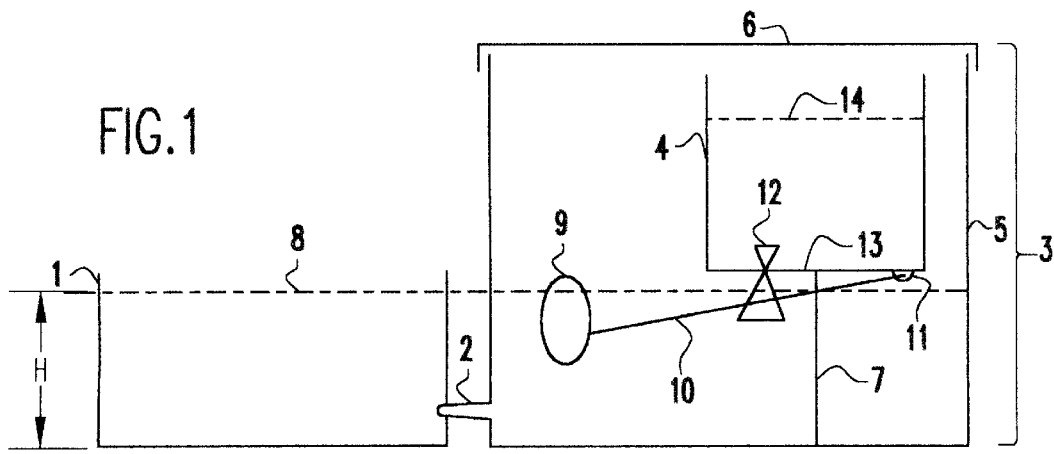
FIG. 1 is a schematic drawing showing one embodiment of a constant level fluid supply apparatus.

Referring now to the drawings, and more particularly to FIG. 1, there is shown a schematic drawing of an apparatus for delivering fluid to a vessel 1. The vessel 1 receives fluid through a passage 2 in the supply source 3. The passage 2 can take the form of a nipple, opening or the like, and can be equipped with a valve or other cut off mechanism (not shown) if it is desired to selectively cut off fluid flow from source 3. The supply source 3 can be comprised of an internal tank 4 positioned within a reservoir 5 housing. A cover 6 can be positioned over both the reservoir 5 and the tank 4 to keep material or other fluids from being mixed with the fluid in the tank 4 and reservoir 5.

Preferably, the position of the tank 4 within the reservoir 5 can be adjusted up and down. This can be accomplished using a track system (not shown), ledge regions or connectors formed in the reservoir (not shown), or using a mechanical brace 7 positioned under the tank 4. The position of the base of the tank 4, as well as float 9 and valve 12, sets the level of fluid at height 8 in the reservoir 5. The float 9 is pivotally connected by arm 10 to the base of the tank 4 at pivot point 11; however, it will be apparent to those of skill in the art that the float can be connected directly to the reservoir 5 or be positioned directly under opening 13. As fluid fills reservoir 5 to height 8, the float 9 moves upward and causes valve 12 to plug or close-off opening 13. Once valve 12 is in place, no more fluid from tank 4 is discharged into reservoir 5.

By moving the tank 4 up or down, the height 8 can be adjusted to any selected level. This can also be accomplished by selecting different valve 12 and/or float 9 configurations. In most applications, such as watering a house plant, providing water to a cut Christmas tree or house pet, as well as industrial applications such as filling a water trough in a cow or hog pen, etc., the ambient air pressure in the reservoir 5 and over the vessel or container 1 will be the same. As such, water from reservoir 5 discharges into the vessel 1 until it is also filled to height 8.

While it is envisioned that in most applications the reservoir 5 and vessel 1 will be positioned on the same ground or base plane, this is not always required. All that is required is that a common plane pass through a portion of the vessel 1 and a portion of the reservoir. This common plane, indicated as height 8, will be constantly maintained because the withdrawal of fluid from the vessel 1, which can result from use by a plant or tree or by other factors such as evaporation, will necessarily cause fluid from reservoir 5 to flow into vessel 1. This, in turn, will cause the valve 12 to open passage 13, causing fluid from tank 4 to flow into reservoir 5.

The tank 4 can be filled with fluid to any level 14 by any variety of methods. It should be understood that the tank 4, while not specifically shown in FIG. 1, can be designed to hold considerably more fluid than is discharged into the reservoir 5 through opening or passage 13. In a Christmas tree watering application, a user would open the top 6 of the water supply 3, fill the tank 4 to level 14, and the water level would be maintained at height 8 in vessel 1. In large industrial applications, tank 4 could itself be a fluid filled conduit from a remote location which projects into the reservoir. The reservoir 5 would not be overfilled due to the fact that valve 12 would block off fluid flow. While FIG. 1 shows the tank 4 within the reservoir 5, it should be understood that it could be positioned outside the reservoir 5. All that is required is that a passage 13 allow fluid communication into the reservoir 5 from the tank, and that a valve 12 or other cut-off mechanism be positioned to automatically stop fluid flow through the passage once a pre-set level 8 in the reservoir is reached.

Figure 2:
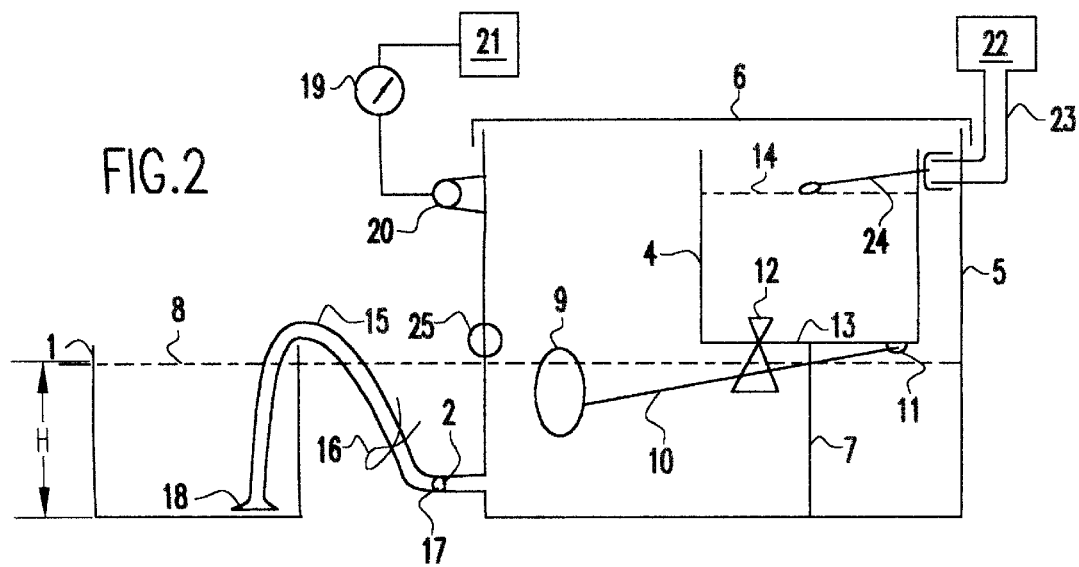
FIG. 2 is a schematic drawing showing enhancements to the embodiment shown in FIG. 1.

FIG. 2 shows a variation on FIG. 1, and like numerals in each Figure have the same meaning. FIG. 2 shows the use of a conduit 15 connecting the reservoir 5 to the vessel 1. This allows the vessel 1 to be remotely positioned a few feet or several hundred feet or more from the reservoir 5. The conduit 15 can be tubing, pipe, or other suitable materials. A clamp 16 and/or valve 17 can be used to selectively cut-off fluid flow from the reservoir 5 into the vessel 1. In addition, the conduit 15 can extend into the vessel 1 over its top, rather than through the wall as shown in FIG. 1. This application may be particularly useful in watering trees, plants, pets, etc., where existing vessels are not intended to be modified. If conduit 15 extends over the top of the vessel 1, it is important that it open up at level below height 8. This can be accomplished by connecting a weight 18 or forming a weighted end in the conduit 15. If the end of the conduit 15 is above height 8, fluid will not run into the vessel 1, and will only be present in the conduit 15 up to height 8. This is because the air pressure in the conduit 15 above height 8 will be equal to the air pressure in the reservoir 5, and this height 8 will be maintained in the conduit 15 for the same reasons that it is maintained in the vessel 1. If the conduit 15 is to extend over the top of the vessel 1 as shown in FIG. 2, the user might need to start fluid flow into the vessel by siphoning action with a pump or by mouth pressure, or by lowering the conduit below height 8 and then quickly placing it in the vessel 1 with its end below height 8.

As indicated above, in large applications the ambient pressure above the fluid in reservoir 5 may not be the same as the ambient pressure above the fluid in vessel 1. By providing gauges 19, valves 20, and air or gas supplies 21 (such as pressurized air, nitrogen, oxygen, etc.), the air pressure in the reservoir 5 can be tightly controlled and adjusted. The cover 6 allows the pressurized air or gas from supply 21 to precisely adjust the conditions within the reservoir 5.

FIG. 2 also shows a constant fluid source 22 which delivers fluid through conduit 23 into tank 4. A float valve 24 can be positioned to close off the conduit 23 when fluid reaches a desired height 14 in the tank 5. Other configurations will be apparent to those of skill in the art.

In case of faulty operations, the reservoir 5 may also be fitted with a drain valve 25 positioned just above height 8 so that the fluid level never exceeds height 8.

Figure 3:
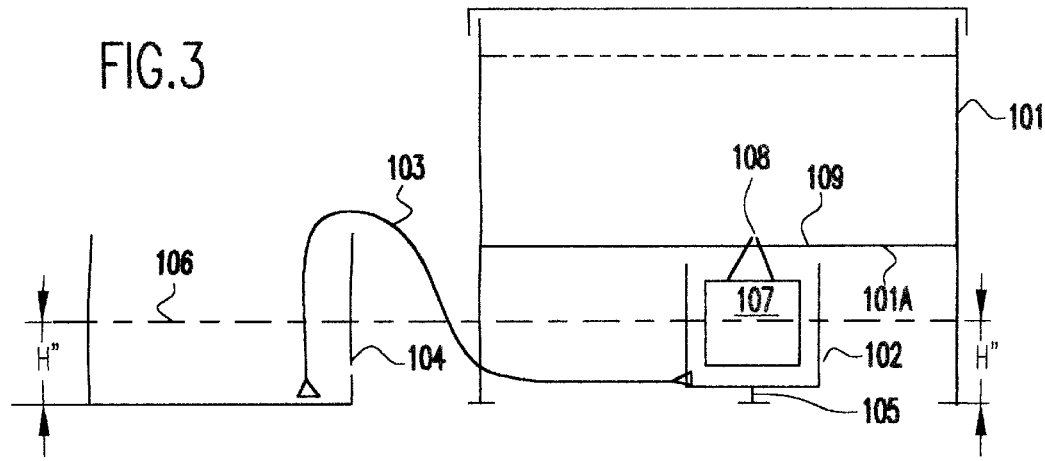
FIG. 3 is a schematic drawing showing another alternative embodiment for a constant level fluid supply apparatus.

FIG. 3 shows a tank 101 positioned above reservoir 102. The reservoir 102 can be connected to the base of the tank 101A or be free standing, and the position of the reservoir 102 may be adjusted relative to the base of the tank 101 using a mechanical brace 105 or other structure. Similar to that described in conjunction with FIG. 2, fluid from reservoir 102 flows out of a passage through conduit 103 and into vessel 104. The height 106 of the fluid in the reservoir 102 and vessel 104 is maintained using a float valve 107 positioned within the reservoir. As fluid fills reservoir 102, the float valve 107 floats upwards and closes off opening 109 in the tank. In some applications, it may be preferred to include a projection 108 which extends into the opening 109 to guide the float 107 upward and to more effectively seal off opening 109. Once the float 107 blocks off opening 109, fluid flow into the reservoir 102 is stopped. Until the float 107 blocks off fluid flow from tank 101, the reservoir 102 will discharge fluid into the vessel 104 until it reaches height 106. As discussed above, all that is required is that a plane at height 106 passes through both the reservoir 102 and the vessel 104. The height 106 can be adjusted by using different sized floats 107, by raising or lowering the reservoir 102 using mechanical brace 105, and by other means. The advantage of the configuration shown in FIG. 3 is that the reservoir 102 can be fairly small compared to tank 101. The reservoir 102 may also be smaller than vessel 104.

While the invention has been described in terms of its preferred embodiments, those skilled in the art will recognize that the invention can be practiced with modification within the spirit and scope of the appended claims.

I claim:

1. A constant level fluid supply apparatus, comprising:

a tank for containing fluid;

a first port positioned in said tank for discharging fluid from said tank;

a reservoir for receiving fluid from said tank which passes through said first port;

a float valve control mechanism positioned in said reservoir for controlling fluid flow through said first port from said tan into said reservoir;

a vessel in direct fluid communication with said reservoir for receiving fluid from said reservoir; and means for adjusting the positions of said reservoir and said tank relative to one another to control a first fluid level within said reservoir and a second fluid level within said vessel, wherein the positions of said reservoir and said tank relative to one another controls an amount of fluid flowing from said tank into said reservoir through said first port, and wherein said reservoir and said vessel are positioned relative to one another such that said first fluid level and second fluid level are in the same plane due to static equilibrium established through said direct fluid communication.

2. The constant level fluid supply apparatus of claim 1 wherein said means for adjusting comprises a tank positioning mechanism for positioning said tank at a plurality of different heights.

3. The constant level fluid supply apparatus of claim 1 wherein said tank is positioned above said reservoir and wherein said means for adjusting comprises a reservoir positioning mechanism for positioning said reservoir at a plurality of different heights.

4. The constant level fluid supply apparatus of claim 3 further comprising a float valve which opens and closes said first port in said tank.

5. The constant level fluid supply apparatus of claim 4 wherein said float valve is positioned within said reservoir.

6. The constant level fluid supply apparatus of claim 1 further comprising a drain valve in said reservoir positioned above said first fluid level.

7. The constant level fluid supply apparatus of claim 1 further comprising a cover positioned over said tank.

8. The constant level fluid supply apparatus of claim 1 further comprising a means for stopping fluid flow between said reservoir and said vessel.

9. The constant level fluid supply apparatus of claim 1 further comprising a conduit which extends from said reservoir to said vessel.

10. The constant level fluid supply apparatus of claim 9 wherein said conduit is tubing.

11. The constant level fluid supply apparatus of claim 1 further comprising a means for stopping fluid flow between said tank and said reservoir.

12. A constant level fluid supply apparatus, comprising a tank for containing fluid;

a first port positioned in said tank for discharging fluid from said tank;

a reservoir for receiving fluid from said tank which passes through said first port, said tank and said first port are positioned in alignment with said reservoir and said first port is located in a bottom of said tank;

a float valve control mechanism positioned in said reservoir for controlling fluid flow through said first port from said tank into said reservoir;

a vessel in direct fluid communication with said reservoir for receiving fluid from said reservoir; and means for controlling a first fluid level within said reservoir and a second fluid level within said vessel, said reservoir and said vessel being positioned relative to one another such that said first fluid level and second fluid level are in the same plane.

13. The constant level fluid supply apparatus of claim 12 further comprising a float valve which opens and closes said first port in said tank.

14. The constant level fluid supply apparatus of claim 12 wherein said float valve is affixed to said tank.

* * * * *